United States Patent [19]

Weber

[11] 4,004,820
[45] Jan. 25, 1977

[54] TRANSPORT CART

[75] Inventor: Kurt Weber, Elgg, Switzerland

[73] Assignee: Rieter Machine Works, Ltd., Winterthur, Switzerland

[22] Filed: Apr. 2, 1975

[21] Appl. No.: 564,481

[30] Foreign Application Priority Data

Apr. 8, 1974 Switzerland .................... 4835/74

[52] U.S. Cl. ................. 280/103; 280/91; 280/408
[51] Int. Cl.² ........................................ B62D 7/00
[58] Field of Search ............ 280/98, 99, 100, 103, 280/442, 443, 444, 445, 47.11, 91, 80 R, 474, 408

[56] References Cited

UNITED STATES PATENTS

| | | | |
|---|---|---|---|
| 1,545,117 | 7/1925 | Baldwin et al. | 280/47.11 |
| 2,537,521 | 1/1951 | Forbes | 280/442 |
| 2,650,100 | 8/1953 | Ronning | 280/103 |
| 2,763,493 | 9/1956 | Hutchinson | 280/103 X |
| 2,950,121 | 8/1960 | Fisher | 280/91 X |
| 3,126,208 | 3/1964 | De Voghel | 280/91 X |
| 3,344,885 | 10/1967 | Rasmussen | 280/103 |
| 3,529,848 | 9/1970 | Harvey | 280/445 X |
| 3,820,811 | 6/1974 | Lapham | 280/408 |
| 3,912,037 | 10/1975 | Krieg | 280/91 |

Primary Examiner—Kenneth H. Betts
Attorney, Agent, or Firm—Kenyon & Kenyon Reilly Carr & Chapin

[57] ABSTRACT

The wheels of the cart are arranged so that a front wheel and a rear wheel can be interconnected with each other and driven off a steering gear. Upon pivoting of the steering gear during turning of the cart, these front and rear wheels pivot in opposite directions so that the rear wheel follows in the wake of the front wheel. When disconnected from the steering gear, the front and rear wheels, as the remaining wheels, are freely rotatable.

12 Claims, 5 Drawing Figures

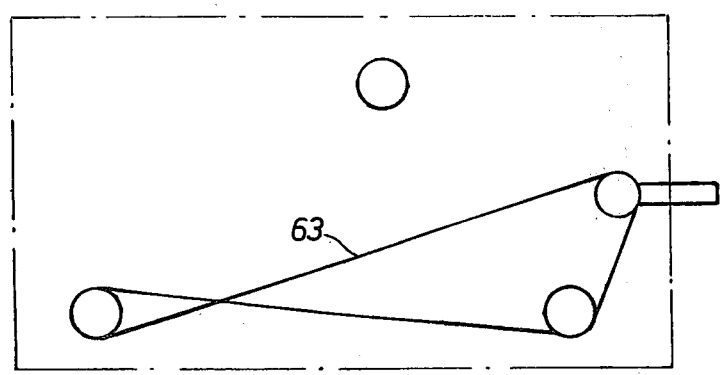
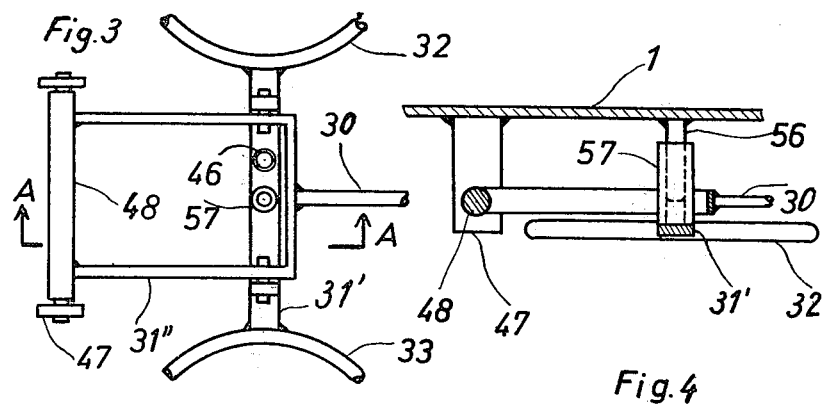

TRANSPORT CART

This invention relates to a transport cart and particularly to a steering arrangement for a transport cart. Still more particularly, this invention relates to a transport cart useful in a textile spinning mill for transporting cans.

As is known, trolleys have been provided with steering arrangements for steering wheels in opposite direction to each other. For example, as described in German Patent DT PS 463,028, it has been known to connect a steering gear indirectly by means of a connecting link and a rope to the front axles of the trolley.

Steering arrangements for transport carts have also been known in which two single wheels at the front of the carts are carried on short axle bearings which are pivotable on vertical shafts and a pair of wheels at the rear are mounted on a single axle which is pivotally mounted on a vertical shaft at the middle of the axle. In these cases, the rear axle and the two front axle bearings are directly connected by means of a shaft. Such an arrangement is described in German Patent DT PS 599,428.

However, these known steering arrangements have a disadvantage in that transport carts equipped with such cannot be driven in whatever direction one desires since mobility is limited to a fixed curve because of the constant connection of the steering gear with the axles of the wheels. Moreover, too much swivelling of the wheels can reduce the stability of the transport carts.

Other transport carts are also known which have only free pivotable swivel rolls. While this arrangement allows driving in whatever direction one desires, there is no stability of the front and rear wheels in driving straight ahead and none at all in curves. In addition, heavily loaded carts having free pivotable swivel rolls can only be driven with effort. Further, a combination of a plurality of carts in a train is not imaginable.

Accordingly, it is an object of the invention to provide a steering arrangement for a transport cart which allows a controlled movement of the cart.

It is another object of the invention to provide a transport cart in which the rear wheels can be driven in the wake of the front wheels.

It is another object of the invention to permit a train of transport carts to negotiate turns with the rear wheels of each cart following in the wake of the front wheels of each cart.

It is another object of the invention to control the direction of forward movement of a transport cart while also allowing a sidewise movement of the cart or a train of carts.

Briefly, the invention provides a transport cart comprising a plurality of support wheels including at least one freely rotatably mounted swivel wheel, a front wheel rotatably mounted on a vertical axis and a rear wheel rotatably mounted on a vertical axis with a steering arrangement whereby the rear wheel follows in the wake of the front wheel during movement of the cart. This steering arrangement includes a pivotally mounted connecting rod, a steering gear connected with the front and rear wheels for pivoting these wheels in opposite directions and means for selectively connecting the connecting rod to the steering gear and the front wheel for pivoting of the front and rear wheels in opposite directions in response to pivoting of the connecting rod.

By steerably connecting at least two wheels while all other wheels are freely pivotable swivel rolls, the cart can be controlled during forward movements. Also, by disengaging these wheels from the connecting rod, the cart can be moved sidewise.

In order to interconnect the steering gear to the front and rear wheels use is made of an endless belt means, such as a chain, rope or toothed belt. In this case, the means to interconnect the connecting rod with the wheels includes a system of levers for engaging or coupling the front wheel with the steering gear.

These and other objects and advantages of the invention will become more apparent from the following detailed description and appended claims taken in conjunction with the accompanying drawings in which:

FIG. 3 illustrates a view of a system of levers employed in accordance with the invention;

FIG. 4 illustrates a view taken along line A—A of FIG. 3; and

FIG. 5 illustrates a schematic view of a rope transmission according to the invention.

Figure 1:
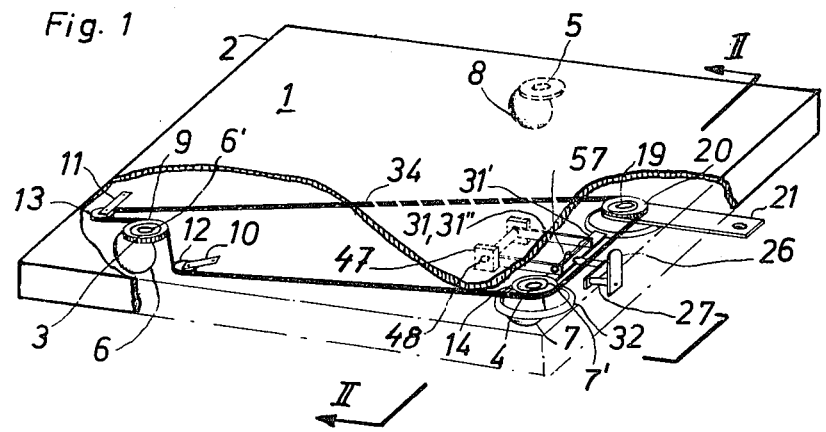
FIG. 1 illustrates a perspective partly broken view of a transport cart using a steering arrangement according to the invention.

Referring to FIG. 1, a sheet metal bottom 1 of a transport cart 2 is supported by a plurality, i.e. three swivel rolls or wheels 6, 7, 8 rotatably mounted on vertical axles 3, 4, 5.

A steering arrangement for controlling the rear wheel 6 and front wheel 7 includes a sprocket wheel rim 9 fixedly mounted to a tail 6' of the swivel roll 6 coaxial to the vertical axle 3 of the swivel roll 6. In addition, a pair of freely rotatable small sprocket wheels 12, 13 are fixed on adjustable swivel bars 10, 11 close to the sprocket wheel rim 9. The bars 10, 11 are mounted via suitable means (not shown) to the underside of the cart bottom 1. A sprocket wheel rim 14 is also pivotally supported on the tail 7' of the swivel wheel or roll 7. This sprocket wheel rim 14 is provided with two vertical grooves 15, 15' (see FIG. 2) which are arranged opposite to each on the periphery of the wheel rim 14. A lever 16 being engaged with either groove 15 or 15' is pivotably supported on an axle 17 which is fixedly supported on a pair of tongues 18 extending from the tail 7' of the swivel roll 7.

The steering arrangement also includes a steering gear in the form of a sprocket wheel 20 and a connecting rod or shaft 21 each of which is independently pivotably supported on a vertical axle 19 which is fixedly mounted to the bottom 1 of the cart 2. The sprocket wheel 20 is provided with two vertical grooves 22, 22' (FIG. 2) opposite to each other on the periphery in a similar way to the sprocket wheel 14. A lever 23 which can also be engaged with either groove 22 or 22' is pivotably supported on an axle 24 which is also fixedly connected with a pair of tongues 25 mounted on the shaft 21. The shaft 21 projects from the forward end of the cart 2 and serves as a hitch or the like to direct turning of the cart 2.

As shown in FIG. 1, an endless belt means 34 in the form of a chain passes about the sprocket wheels 9, 14, 20 to transmit motion between the sprocket wheel 20 (steering gear) and the front and rear wheels 7, 6. The chain 34 is guided around the two sprocket wheels 12 and 13 so that sprocket wheel 9 is pivoted in opposite direction to the sprocket wheels 14, 20.

Figure 2:
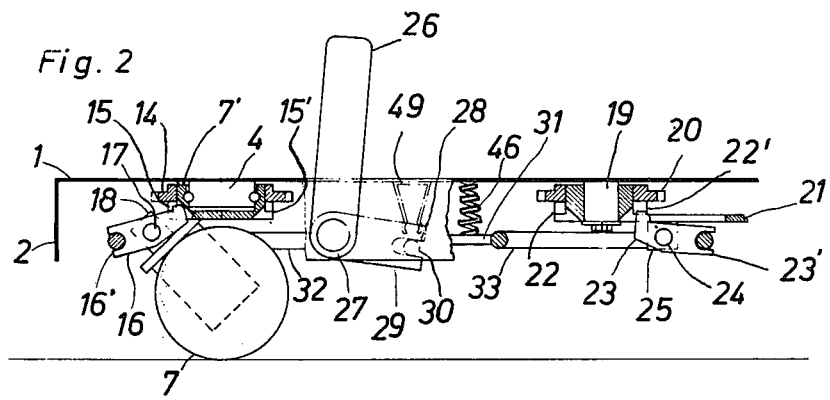
FIG. 2 illustrates an enlarged partial sectional view taken along line II—II of FIG. 1.

Referring to FIGS. 1, 2 and 3, a means in the form of a system of levers is used to selectively connect the connecting rod or shaft 21 to the sprocket wheel 20 (steering gear) as well as to the sprocket wheel 14 of the front roll 7. This lever system includes a frame composed of a pair of rings 32, 33 which are coaxially disposed about the respective sprocket wheels 14, 20 (FIG. 2) and a connection 31' between the rings 32, 33. In addition, the lever system includes a frame 31" (FIGS. 1 and 3) which is pivotally supported on an axle 48 secured in a pair of tongues 47 which depend from the cart bottom 1. The frame 31" carries a projecting bar 30 which is received in a slot 28 at the end of a lever 29. The lever 29, in turn, is fixedly mounted on a shaft 27 (FIGS. 1 and 2) which projects through and is rotatably mounted in a side wall of the cart bottom 1. The shaft 27 also carries a lever 26 at the end which protrudes laterally from the cart 2.

As shown in FIG. 3, the frame 31" carries a pair of pins which are received in blocks fixed on the connection 31' such that the frame made up of the connection 31' and rings 32, 33 is pivotally carried on the frame 31".

Referring to FIGS. 3 and 4, in order to effect a parallel up-and-down movement of the two rings 32, 33, a bolt 56 is fixed to the cart bottom 1 and is guided in a hub 57 perpendicularly fixed to the connection 31'. Any discrepancy between the vertical axis and the pivoted axle 48 after the frame 31" is pivoted about axle 48, is equalized in the boring of the tongues 47 which carry the axle 48.

As shown in FIG. 2, the respective levers 16, 23 each have a slot 16', 23' which engages over the respective rings 32, 33. Thus, as the rings 32, 33 move vertically, the levers 16, 23 pivot between a locking position in the grooves 15, 15', 22, 22' of the respective sprocket wheel rims 14, 20 and an unlocked position out of contact with the sprocket wheels 14, 20.

As shown in FIGS. 2 and 3, a compression spring 46 is mounted between the cart bottom 1 and the connection 31' in order to bias the rings 32, 33 downwardly and, thus, the levers 16, 23 into engagement with the sprocket wheels rims 14, 20. Also, a stop in the form of a pair of stop springs 49 is mounted on the cart bottom 1 to engage the bar 30 of the pivotal frame 31" and, thus, to hold the rings 32, 33 in a raised position with the levers 16, 23 below the wheel rims 14, 20.

In operation, for straight-line motion of the transport card 2, the axles of all the swivel rolls 6, 7, 8 are in a parallel position to each other. After pivoting the lever 26 to unlatch the bar 30 from the stop-spring 49, the rings 32, 33 are lowered by means of the system of levers and held in this position by the compression spring 46. At this time, as soon as the swivel rolls are turned in straight-line position, the levers 16, 23 engage with the grooves 15 and 22 or 15' and 22' of the sprocket wheels 14 and 20 under the bias of the spring 46 and connect the sprocket wheels 14, 20 with the front swivel roll 7 and the shaft 21, respectively. Shaft 21 can then be turned in such a way that the front swivel roll 7 turns to the left while the rear roll 6 is turned to the right the same amount. This means that the rear roll 6 will now run in the wake of the front roll 7. The angle of rotation of the swivel rolls can be increased at choice and may even reach 180° or more without any risk for the stability of the cart in any position.

If the transport cart 2 is towed together with other similar transport carts by means of the shafts 21 in order to form a train, then all the carts are able to run in the wake of the first cart and also run around corners of any size desired.

In order to shift the whole train parallel to itself, that is perpendicular to the running direction of the train, the levers 16, 23, on the shafts 21 and on swivel rolls 7 can be unlatched via the lever 26. The lever 26 is then held in that position by means of the bar 30 engaging in the stop springs 49. The swivel rolls then are freely rotatable and the whole train can be moved in a parallel direction since the swivel rolls are pivoted automatically as the result of the lateral motion. As soon as the lever 26 is brought back to the original position, the levers 16, 23 respectively, will engage with the grooves 15, 22, respectively, under the bias of the spring 46. The train will now again run in the wake of the truck (not shown) pulling the same.

Referring to FIG. 5, instead of using a chain 34 as shown in FIG. 1, a rope 63 may be used to interconnect the front and rear wheels. In this case, the rope 63 is put around cable-drums which replace the sprocket wheels 6, 7 (FIG. 1). The two sprocket wheels 12, 13 are thus not necessary since the rope 63 is crossed as shown in FIG. 6.

The above described steering arrangement provides a remarkable maneuvering capability to all directions not only of a single cart but also of a whole train of carts. Previously known transport carts could run in the wake of a truck as single cart or as trains but there was no possibility of moving them laterally without much technical investment.

What is claimed is:

1. A transport cart comprising a plurality of support wheels including at least one freely rotatably mounted swivel wheel, a front wheel rotatably mounted on a vertical axis, and a rear wheel rotatably mounted on a vertical axis; and a steering arrangement including a pivotally mounted connecting rod, an endless belt engaging said steering gear, said rear wheel and said front wheel, a steering gear connected with said front and rear wheels for pivoting said front and rear wheels in opposite directions and means for selectively connecting said connecting rod to said steering gear and said front wheel for pivoting of said front and rear wheels in opposite directions in response to pivoting of said connecting rod whereby said rear wheel follows in the wake of said front wheel during movement of the cart.

2. A transport cart as set forth in claim 1 wherein said front and rear wheels are rotatable in the range of 360°.

3. A transport cart as set forth in claim 1 wherein said endless belt means is an endless chain.

4. A transport cart as set forth in claim 1 wherein said endless belt means is a rope.

5. A transport cart as set forth in claim 1 wherein said endless belt means is a toothed belt.

6. A transport cart comprising
a base;
at least one swivel roll freely rotatably mounted on said base;
a front wheel mounted on said base on a vertical axis;
a rear wheel mounted on said base on a vertical axis;
a connecting rod pivotally mounted on said base in projecting relation;
a steering gear connected with said front and rear wheels for pivoting said front and rear wheels in opposite directions; and means for selectively interconnecting said steering gear and said front and rear wheels to said connecting rod for pivoting said front and rear wheels in opposite directions in response to pivoting of said connecting rod, said interconnecting means including a system of levers pivotally mounted on said base.

7. A transport cart as set forth in claim 6 wherein said front and rear wheels are disengagable from said connecting rod and freely rotatable.

8. A transport cart comprising a plurality of support wheels including at least one freely rotatably mounted swivel wheel, a front wheel rotatably mounted on a vertical axis, and a rear wheel rotatably mounted on a vertical axis; and a steering arrangement including a pivotally mounted connecting rod, an independently pivotably mounted sprocket wheel, an endless chain connecting said sprocket wheel to said front and rear wheels, and means for selectively connecting said connecting rod to said sprocket wheel and said front wheel for pivoting of said front and rear wheels in opposite directions in response to pivoting of said connecting rod whereby said rear wheel follows in the wake of said front wheel during movement of the cart.

9. A transport cart comprising a plurality of support wheels including at least one freely rotatably mounted swivel wheel, a front wheel rotatably mounted on a vertical axis, and a rear wheel rotatably mounted on a vertical axis; and a steering arrangement including a pivotally mounted connecting rod, a steering gear connected with said front and rear wheels for pivoting said front and rear wheels in opposite directions and means including a protruding lever for selectively connecting said connecting rod to said steering gear and said front wheel for pivoting of said front and rear wheels in opposite directions in response to pivoting of said connecting rod whereby said rear wheel follows in the wake of said front wheel during movement of the cart.

10. A transport cart comprising a plurality of support wheels including at least one freely rotatably mounted swivel wheel, a front wheel rotatably mounted on a vertical axis, and a rear wheel rotatably mounted on a vertical axis; and a steering arrangement including a pivotally mounted connecting rod, a steering gear connected with said front and rear wheels for pivoting said front and rear wheels in opposite directions and means including a system of levers for selectively connecting said connecting rod to said steering gear, said front wheel and said rear wheel for pivoting of said front and rear wheels in opposite directions in response to pivoting of said connecting rod whereby said rear wheel follows in the wake of said front wheel during movement of the cart, said system of levers being movably guided in a vertical direction.

11. A transport cart as set forth in claim 10 wherein said system of levers includes a frame and two rings pivotably mounted on said frame, and levers engaged in said rings for engaging said steering gear with said front and rear wheels.

12. A transport cart as set forth in claim 10 wherein said means includes a spring holding said lever system in one extreme position and a stop holding said lever system in an opposite extreme position.

* * * * *